United States Patent
Chang et al.

(10) Patent No.: US 8,120,487 B2
(45) Date of Patent: Feb. 21, 2012

(54) POWER-SAVING WIRELESS INPUT DEVICE AND SYSTEM

(75) Inventors: Wei Chang, Hsinchu Hsien (TW); Chien-Sheng Chen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 294 days.

(21) Appl. No.: 12/341,050

(22) Filed: Dec. 22, 2008

(65) Prior Publication Data

US 2009/0179761 A1  Jul. 16, 2009

(30) Foreign Application Priority Data

Jan. 15, 2008 (TW) .............................. 97101431 A

(51) Int. Cl.
*G08B 13/14* (2006.01)
(52) U.S. Cl. ................. 340/572.1; 340/10.1; 340/572.2; 340/572.3; 340/572.4; 340/572.5; 340/572.6; 340/572.7; 340/572.8; 340/572.9; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385
(58) Field of Classification Search .................. 340/541, 340/10.1–10.6, 572.1–572.9; 235/375–385
See application file for complete search history.

(56) References Cited

U.S. PATENT DOCUMENTS

| | | | | |
|---|---|---|---|---|
| 3,111,665 | A * | 11/1963 | Werner et al. ................. | 342/125 |
| 3,201,692 | A * | 8/1965 | Lyon et al. ...................... | 455/75 |
| 6,329,794 | B1 * | 12/2001 | Oeda et al. .................... | 320/132 |
| 6,476,708 | B1 * | 11/2002 | Johnson ..................... | 340/10.34 |
| 6,622,567 | B1 * | 9/2003 | Hamel et al. ................... | 73/786 |
| 7,259,677 | B2 * | 8/2007 | Fujii ......................... | 340/572.7 |
| 7,321,290 | B2 * | 1/2008 | Stevens et al. ............... | 340/10.1 |
| 7,405,659 | B1 * | 7/2008 | Hyde ......................... | 340/572.4 |
| 7,496,521 | B1 * | 2/2009 | Louie et al. ....................... | 705/2 |
| 7,737,847 | B2 * | 6/2010 | Malone et al. ............. | 340/572.1 |
| 7,825,807 | B2 * | 11/2010 | Mickle et al. .............. | 340/572.1 |

(Continued)

FOREIGN PATENT DOCUMENTS

CN  1917331  2/2007

(Continued)

OTHER PUBLICATIONS

Cho et al., 2005, Design and implementation of active RFID system platform, proceedings of the international symposium on applications and the internet workshop.*

(Continued)

*Primary Examiner* — George Bugg
*Assistant Examiner* — Paul Obiniyi
(74) *Attorney, Agent, or Firm* — Edell, Shapiro & Finnan, LLC

(57) ABSTRACT

A power-saving wireless input device and an associated system are included. The wireless input device comprises an antenna, an RFID transponder, an energy-storing unit, and a sensing unit. The RFID transponder receives an AC signal via the antenna, and converts the AC signal into a DC signal. The energy-storing unit receives the DC signal for charging. The sensing unit, which is powered by the energy-storing unit, generates an input signal to the RFID transponder. The RFID transponder demodulates the AC signal to generate a request signal, and performs load modulation according to the input signal to generate a reply signal in response to the request signal. The reply signal is then transmitted via the antenna.

9 Claims, 7 Drawing Sheets

U.S. PATENT DOCUMENTS

| | | |
|---|---|---|
| 7,860,680 B2 * | 12/2010 | Arms et al. .................. 702/127 |
| 2003/0234730 A1 * | 12/2003 | Arms et al. ............. 340/870.01 |
| 2005/0024187 A1 * | 2/2005 | Kranz et al. ............... 340/10.33 |
| 2005/0054293 A1 * | 3/2005 | Bann ............................ 455/41.3 |
| 2006/0158310 A1 * | 7/2006 | Klatsmanyi et al. ......... 340/10.1 |
| 2006/0238301 A1 * | 10/2006 | Wu et al. ...................... 340/10.1 |
| 2006/0244568 A1 * | 11/2006 | Tong et al. ................. 340/10.41 |
| 2006/0244595 A1 * | 11/2006 | Malone et al. ............. 340/572.1 |
| 2006/0267731 A1 * | 11/2006 | Chen ............................. 340/10.1 |
| 2006/0281435 A1 * | 12/2006 | Shearer et al. ............. 455/343.1 |
| 2007/0006298 A1 * | 1/2007 | Malone et al. ................. 726/17 |
| 2007/0057771 A1 * | 3/2007 | Tomioka ........................ 340/10.1 |
| 2007/0057773 A1 * | 3/2007 | Hsieh et al. ................ 340/10.41 |
| 2007/0176748 A1 * | 8/2007 | Salamitou ..................... 340/10.1 |
| 2007/0290864 A1 * | 12/2007 | Fujij ........................... 340/572.7 |
| 2008/0150698 A1 * | 6/2008 | Smith et al. ................... 340/10.4 |
| 2008/0218351 A1 * | 9/2008 | Corrado et al. ............ 340/572.4 |
| 2009/0102296 A1 * | 4/2009 | Greene et al. ................. 307/149 |
| 2009/0153299 A1 * | 6/2009 | Ovard ........................... 340/10.1 |
| 2009/0195356 A1 * | 8/2009 | Tuttle ............................ 340/10.1 |
| 2010/0026248 A1 * | 2/2010 | Barrade et al. ................ 320/166 |
| 2010/0308970 A1 * | 12/2010 | Rofougaran et al. ......... 340/10.1 |

FOREIGN PATENT DOCUMENTS

CN            1516518 A       7/2007

OTHER PUBLICATIONS

Ammer et al, 2006, Ultra low power supply design, IEEE Circuits & Devices.*

Alex et al, Power management strategy for battery driven higher class UHF tags supported by energy harvesting devices, IEEE Automatic Identification Advances Technologies, Jun. 2007.*

* cited by examiner

POWER-SAVING WIRELESS INPUT DEVICE AND SYSTEM

FIELD OF THE INVENTION

The present invention relates to wireless input technology, and more particularly, to a power-saving wireless input device and system.

BACKGROUND OF THE INVENTION

Wireless input devices like wireless mouse devices and wireless keyboard devices are commonly used input tools for computers. FIG. 1 shows a schematic diagram of a conventional wireless input device 13 for inputting data to a computer host 11, and which comprises a radio frequency (RF) transmitter 131, a sensing unit 132 and a battery 133. Input signals, such as signals input by a mouse or by a keyboard sensed by the sensing unit 132, are modulated by the RF transmitter 131, and are transmitted to an RF receiver 12 and then to the computer host 11. Electric energy required by the RF transmitter 131 and the sensing unit 132 is provided by the battery 133.

However, since the RF transmitter 131 is quite power-consuming, the battery 133 is easily used up and thus needs to be frequently replaced, resulting in not only environmental-unfriendly effects but also usage inconveniences.

SUMMARY OF THE INVENTION

In view of the foregoing, an object of the invention is to provide a wireless input device and an associated wireless input system, which accomplish power-saving effects and usage convenience compared to the prior art.

Another object of the invention is to provide a wireless input device and an associated wireless input system, which lower manufacturing costs compared to the prior art.

A wireless input device according to an embodiment of the invention comprises an antenna; a radio frequency identification (RFID) transponder for receiving an AC signal via the antenna; a power supply unit coupled to the RFID transponder; and a sensing unit, powered by the power supply unit to generate an input signal to the RFID transponder. The RFID transponder demodulates the AC signal to generate a request signal, and performs load modulation according to the input signal, so as to generate a reply signal in response to the request signal, followed by transmitting the reply signal via the antenna.

A wireless input system according to another embodiment of the invention comprises an electronic device; an RF transceiver coupled to the electronic device and for transmitting a first RF signal; and a wireless input device receiving the first RF signal to produce electric energy, and using the electric energy produced to modulate an input signal to generate a second RF signal associated with the input signal. The RF transceiver receives the second RF signal, which is then demodulated into a baseband signal to be transmitted to the electronic device.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 2:
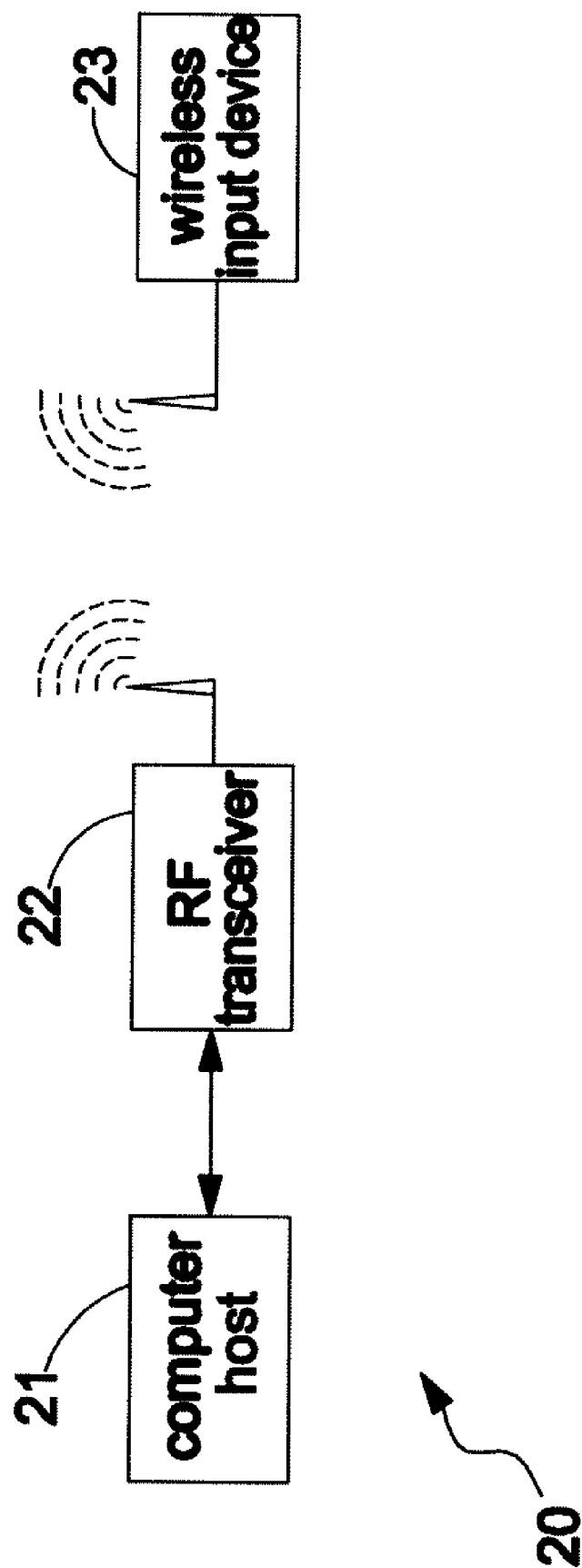
FIG. 2 is a block diagram of a wireless input system according to one embodiment of the invention.

Referring to FIG. 2 showing a block diagram of a wireless input device according to one embodiment of the invention, a wireless input system 20 comprises an electronic device, e.g. a computer host 21, an RF transceiver 22, and a wireless input device 23. The wireless input device 23 may be a wireless mouse, a wireless keyboard, or, e.g., a sensing device capable of sensing temperature, humidity, pressure or pulse. The RF transceiver 22 is coupled to the electronic device, e.g., computer host 21, via a transmission interface (like USB or RS232) or built-in in the electronic device, and is for transmitting a first RF signal to the wireless input device 23. The wireless input device 23 uses the first RF signal to produce electric energy, and, using the electric energy produced, modulates an input signal such as an input signal from a mouse, an input signal from a keyboard, or a sensing signal of temperature, humidity, pressure or pulse to generate a corresponding second RF signal to be transmitted to the RF transceiver 22. The RF transceiver 22 demodulates the second RF signal to a baseband signal to be transmitted to the computer host 21. Thus, the wireless input device 23 may include passive devices but not power supplies such as batteries, and may generate electric energy by wireless inducing means.

Figure 3:
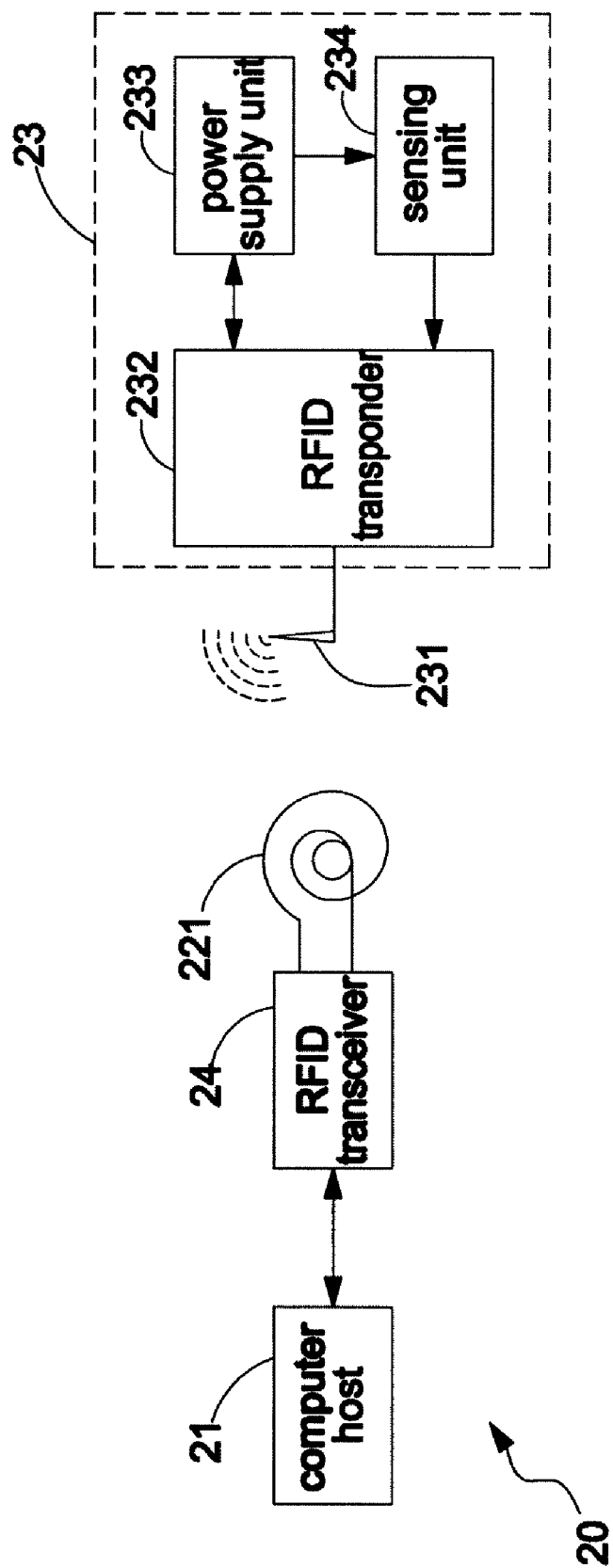
FIG. 3 is a block diagram of the wireless input system in FIG. 2 according to one embodiment.

FIG. 3 shows a block diagram of the wireless input system 20 in FIG. 2 according to one embodiment. The RF transceiver 22 is an RFID transceiver 24. The wireless input device 23 comprises an antenna 231, an RFID transponder 232, a power supply unit 233, and a sensing unit 234. In this embodiment, the first RF signal is an AC signal which results from modulating a signal onto an RF AC carrier. The RFID transceiver 24 comprises a coil antenna 221 for producing an electromagnetic field. The antenna 231 of the wireless input device 23 is induced by the AC electromagnetic field to receive the first RF signal. In another embodiment, the RFID transceiver 24 may produce AC electromagnetic waves, via which the antenna 231 receives the first RF signal.

The sensing unit 234 uses electric energy provided by the power supply unit 233 to generate the aforesaid input signal to be transmitted to the RFID transponder 232. The RFID transponder 232 demodulates the first RF signal and removes the carrier to generate a baseband request signal of the RFID transceiver 24, wherein the request signal indicates that the RFID transceiver 24 requests the RFID transponder 23 to send back data stored therein. Based on the input signal generated by the sensing unit 234, the RFID transponder 232 performs load modulation to generate a backscatter reply signal in response to the request signal to be transmitted to the RFID transceiver 24 via the antenna 231 and the coil antenna 221. In the embodiment shown in FIG. 3, apart from an RF interface that receives and transmits RF signals via the antenna 231, the RFID transponder 232 has another transmission interface that receives the input signal from the sensing unit 234. Electric energy needed by transmission between the RFID transponder 232 and the sensing unit 234 is provided by the power supply unit 233. Thus, the dual interface design of the transponder 232 allows applications on input means such as wireless mouse devices and wireless keyboards for power-saving effects.

Figure 4:
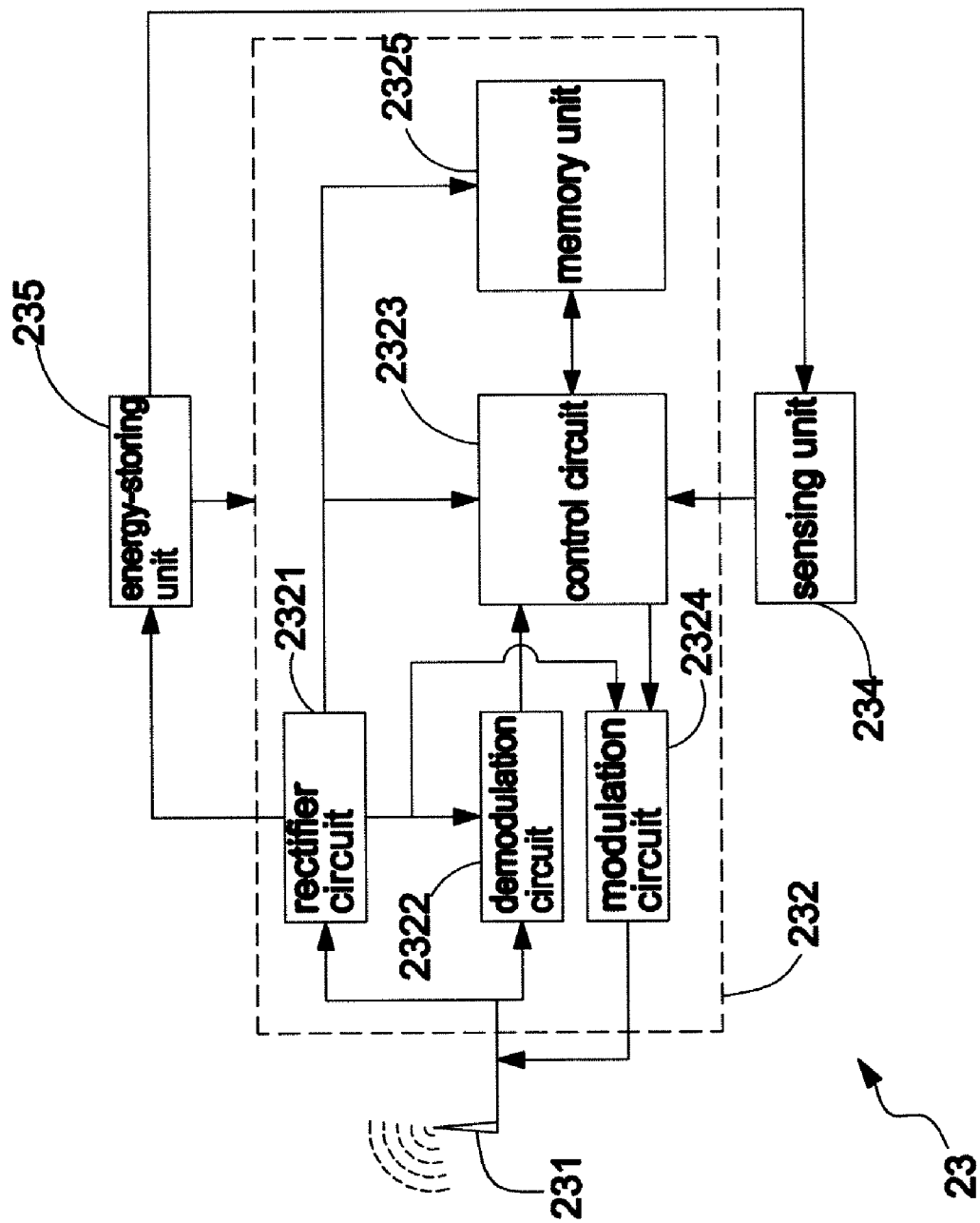
FIG. 4 is a block diagram of a wireless input device in FIG. 3 according to one preferred embodiment.

FIG. 4 is a block diagram of the wireless input device 23 in FIG. 3 according to one preferred embodiment. The RFID transponder 232 comprises a rectifier circuit 2321, a demodulation circuit 2322, a control circuit 2323, a modulation circuit 2324 and a memory unit 2325. The power supply unit 233 of FIG. 3 is an energy-storing unit 235 coupled to the rectifier circuit 2321, which converts the first RF signal received via the antenna 231 to a DC voltage. The rectifier circuit 2321 also includes a regulator (not shown) for producing a constant voltage. On top of charging the energy-storing unit 235, the constant voltage also provides electric energy required by operations of other circuits in the RFID transponder 232; that is, operations of the demodulation circuit 2322, the control circuit 2323, the modulation circuit 2324 and the memory unit 2325. The energy-storing unit 235 may be a capacitor or a chargeable battery, and electric energy stored therein is designated for use of the sensing unit 234 as well as operations of the transponder 232. Therefore, the RFID transponder 232 has two power supplies, namely, the energy-storing unit 232 and the rectifier circuit 235 for flexible uses. For instance, the RFID transponder 232 may rely on electric energy provided by the rectifier circuit 235 when there is small power consumption; however, when power consumption of the RFID transponder 232 raises from increase of processing input signals generated by the sensing unit 234 or increase in communication traffic or distance between the transceiver 24 and the transponder 232, the power shortage is made up by the energy-storing unit 235. An advantage of this embodiment is that, when the wireless input device 23 is not being operated, it continuously receives RF carriers to charge electric energy into a charging component of the energy-storing unit 235. When the wireless input device 23 is given frequent operations, electric energy required by sensing unit 234 and the RFID transponder 232 is acquired from the energy-storing unit 235.

The control circuit 2323 is coupled to the sensing unit 234, and is for converting the input signal generated by the sensing unit 234 to input data to be stored in the memory unit 2325. The demodulation circuit 2322 removes the carrier of the first RF signal and demodulates the first RF signal to generate the baseband request signal. Upon receiving and decoding the baseband request signal, the control circuit 2323 fetches the input data from the memory unit 2325 to generate a corresponding control signal in response to the request signal. The modulation circuit 2324 then performs load modulation according to the control signal to generate the reply signal.

Figure 5:
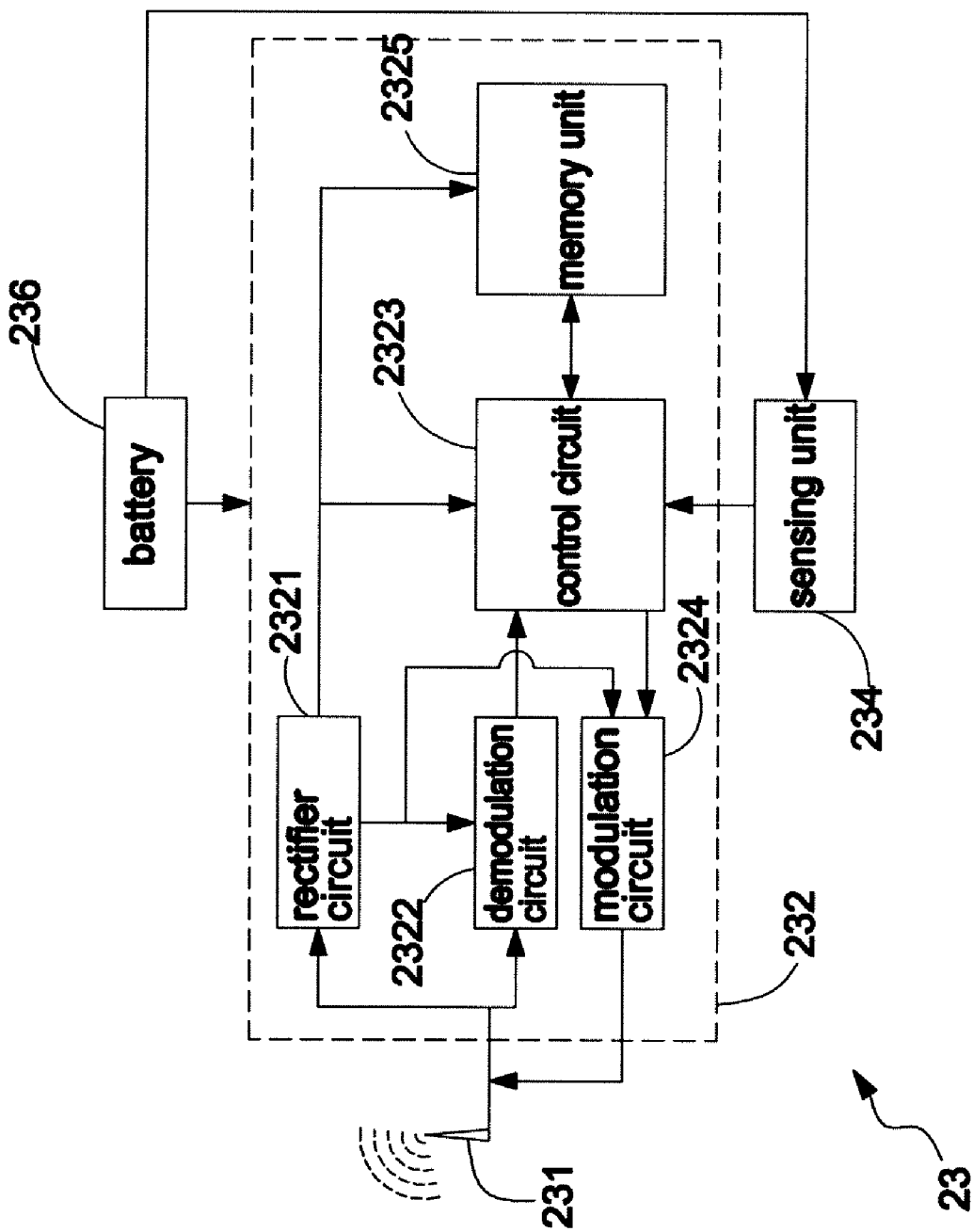
FIG. 5 is a block diagram of the wireless input device in FIG. 3 according to another preferred embodiment.

FIG. 5 is a block diagram of the wireless input device 23 in FIG. 3 according to another preferred embodiment. The power supply unit 233 is a battery 236 for providing electric energy to the RFID transponder 232 and the sensing unit 234. Operations of the RFID transponder 232 and the sensing unit 234 are similar to those in FIG. 4, and are omitted for brevity. In this preferred embodiment, the RFID transponder 232 flexibly uses electric energy provided by the battery 236 or the DC voltage provided by the rectifier circuit 2321.

Figure 6:
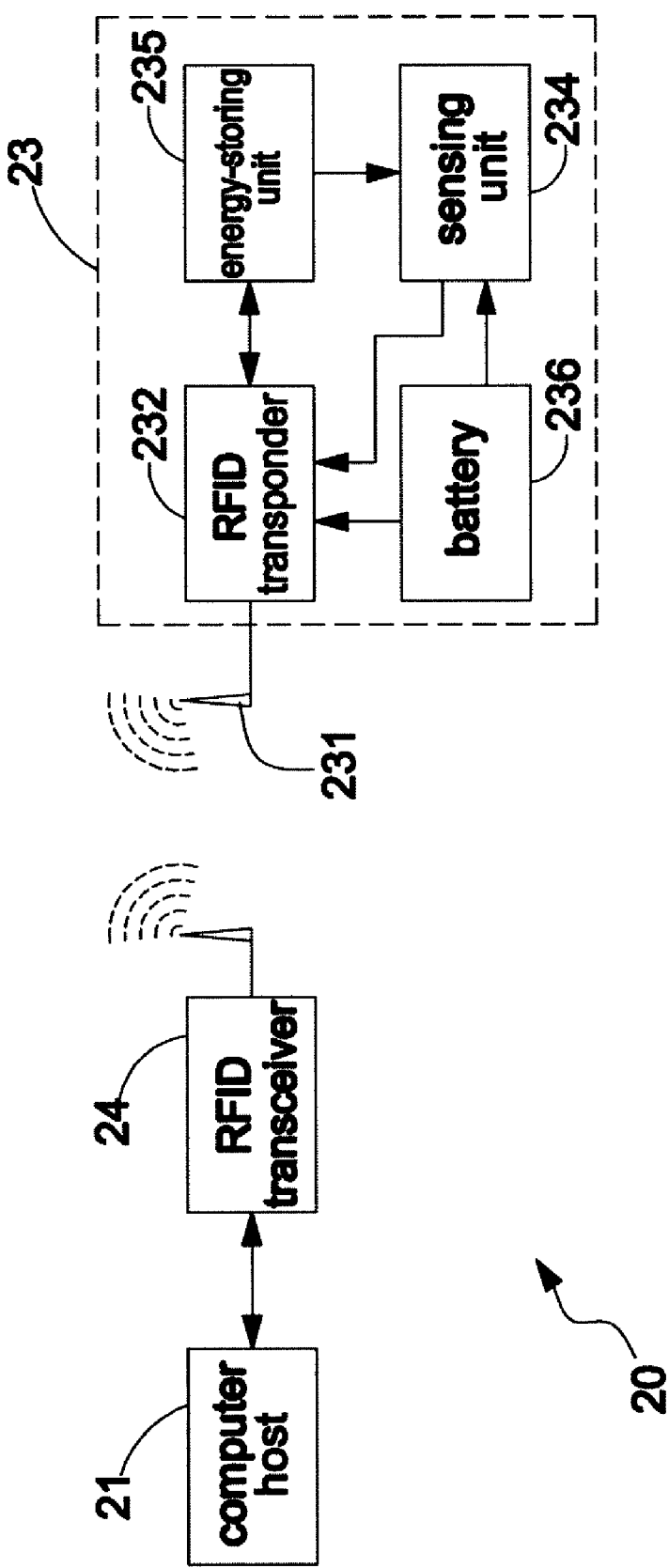
FIG. 6 is a block diagram of the wireless input system in FIG. 2 according to one preferred embodiment.

FIG. 6 is a block diagram of the wireless input system 20 in FIG. 2 according to another preferred embodiment. The RF transceiver 22 is the RFID transceiver 24. The wireless input device 23 comprises the antenna 231, the RFID transponder 232, the energy-storing unit 235, the sensing unit 234 and the battery 236. The wireless input system 23 in FIG. 6 is regarded as a combination of the wireless input devices in FIG. 4 and FIG. 5. That is, two power supplies, namely, the energy-storing unit 235 and the battery 236 are both included, with usage priority of electric energy of the energy-storing unit 235 preceding that of the battery. Thus, double effects of power-saving and reducing changes of flat batteries are achieved.

Figure 7:
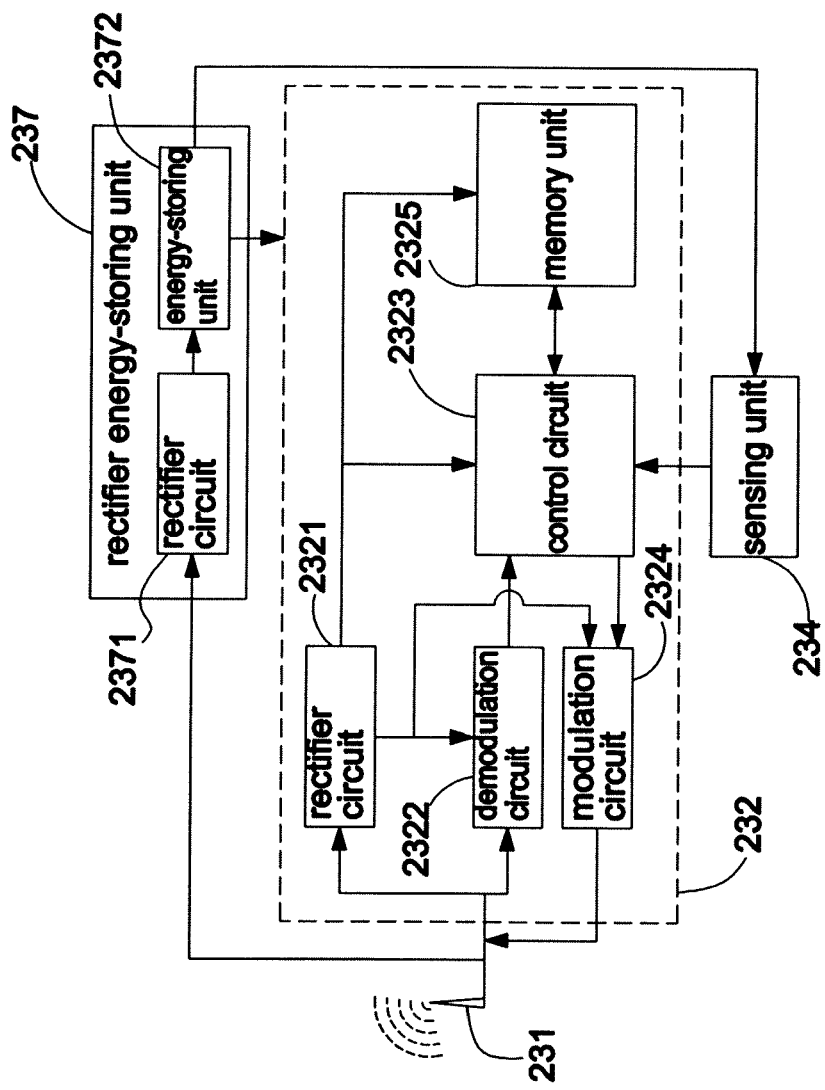
FIG. 7 is a block diagram of the wireless input system in FIG. 2 according to another preferred embodiment.
Figure 7:
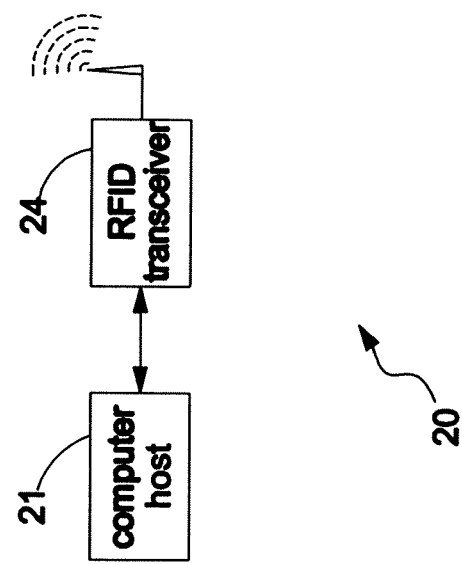

FIG. 7 is a block diagram of the wireless input system 20 in FIG. 2 according to another preferred embodiment. The RF transceiver 22 is the RFID transponder 24. The wireless input device 23 comprises the antenna 231, the RFID transponder 232, a rectifier energy-storing unit 237, and the sensing unit 234. The rectifier energy-storing unit 237, coupled to the antenna 231, includes a rectifier circuit 2371 and an energy-storing circuit 2372, and is for converting the AC carrier received by the antenna 231 to a DC voltage and storing electric energy for the RFID transponder 232 and the sensing unit 234. The energy-storing circuit 2372 may be a capacitor or a chargeable battery. Operations of the RFID transponder 232 and the sensing unit 234 are similar to those in FIG. 4, and are omitted for brevity. The circuit in FIG. 7 may further include a battery as in FIG. 6 to provide electric energy to the RFID transponder 232 and the sensing unit 234, thus increasing flexibility of power supply.

Figure 1:
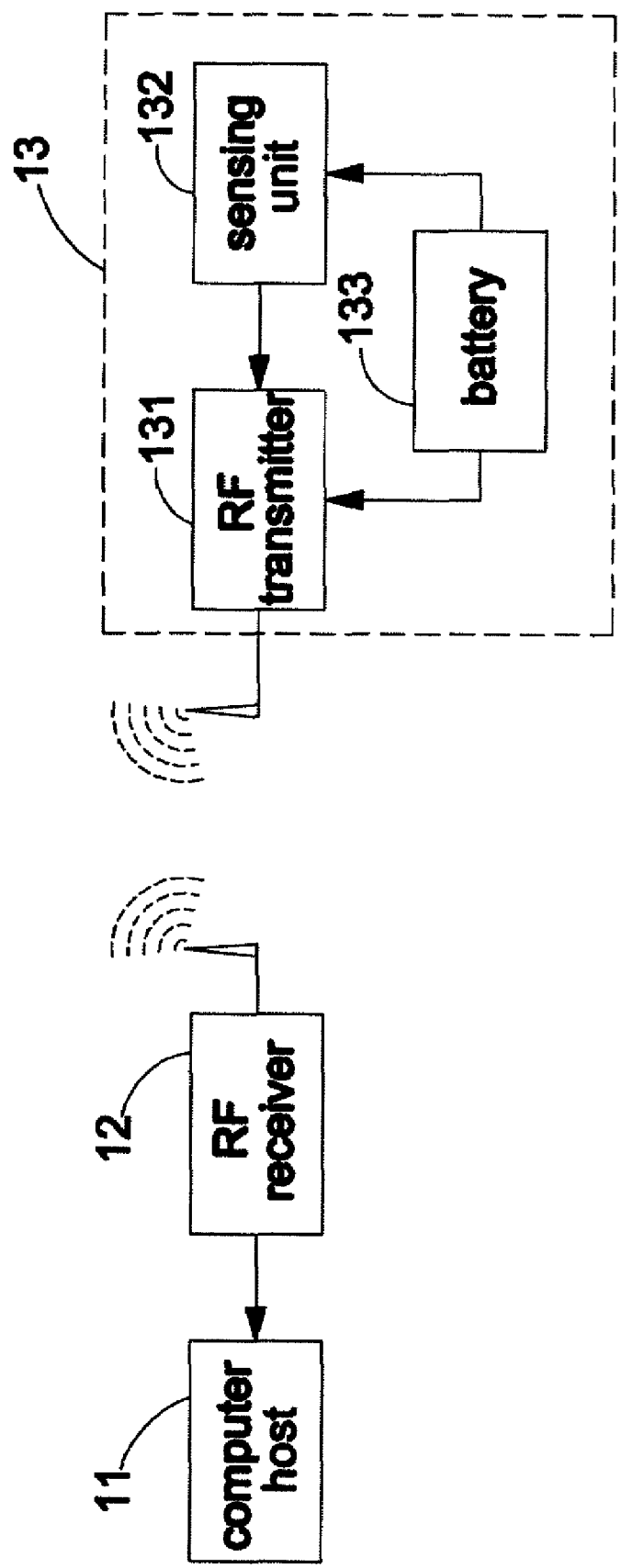
FIG. 1 is a schematic diagram showing a structure of a conventional wireless input device.

In the embodiments shown in FIG. 3 to FIG. 7, since hardware of the RFID transponder adopted by the wireless input device costs far less than that of the RF transmitter adopted by the prior wireless input device as shown in FIG. 1, the invention significantly reduces costs for manufacturers compared to the prior art. In addition, power consumption of the RFID transponder is much less than that of the RF transmitter, and therefore the invention substantially prolongs lifespan of batteries as well as reducing chances of flat batteries.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless input device, comprising:
an antenna;
a radio frequency identification (RFID) transponder, for receiving an AC signal via the antenna;
a first power supply unit, coupled to the RFID transponder;
a sensing unit, powered by the first power supply unit only, for generating an input signal to the RFID transponder;
wherein, the RFID transponder, which is powered only by the AC signal in a first mode and powered by the AC signal and the first power supply unit in a second mode, demodulates the AC signal to generate a request signal, and performs load modulation according to the input signal to generate a reply signal in response to the request signal, followed by transmitting the reply signal via the antenna, and
a second power supply unit, coupled to the RFID transponder and the sensing unit, receiving no power from the AC signal in the first mode and the second mode, wherein the RFID transponder and the sensing unit are powered by the AC signal, the first power supply unit and the second power supply unit in a third mode, wherein energy of the first power supply is consumed before energy of the second power supply in the third mode.

2. The wireless input device according to claim 1, wherein the input signal is an input signal from a mouse device, an input signal from a keyboard, or a sensing signal from a sensing device.

3. The wireless input device according to claim 1, wherein the second power supply unit is a battery.

4. The wireless input device according to claim 1, wherein the RFID transponder comprises a rectifier circuit for converting the AC signal to a DC voltage, and the first power supply unit is an energy-storing unit for receiving the DC voltage for charging.

5. The wireless input device according to claim 4, wherein the energy-storing unit comprises a chargeable battery.

6. The wireless input device according to claim 1, wherein the first power supply unit is a rectifier energy-storing unit, which receives the AC signal via the antenna and converts the AC signal to a DC voltage for charging.

7. The wireless input device according to claim 6, further comprising:
    a battery for providing electric energy to the RFID transponder and the sensing unit.

8. The wireless input device according to claim 1, wherein the RFID transponder comprises:
    a demodulation circuit for demodulating the AC signal to generate the request signal;
    a control circuit, receiving the request signal, for converting the input signal to input data, and for generating a corresponding control signal according to the input data; and
    a modulation circuit for performing load modulation according to the control signal to generate the reply signal.

9. The wireless input device according to claim 8, wherein the RFID transponder further comprises:
    a memory unit coupled to the control circuit and for storing the input data.

\* \* \* \* \*